United States Patent
Foote et al.

(10) Patent No.: US 7,333,135 B2
(45) Date of Patent: Feb. 19, 2008

(54) METHOD, APPARATUS, AND SYSTEM FOR REMOTELY ANNOTATING A TARGET

(75) Inventors: Jonathan T. Foote, Menlo Park, CA (US); Donald G. Kimber, Montara, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 714 days.

(21) Appl. No.: 10/271,133

(22) Filed: Oct. 15, 2002

(65) Prior Publication Data
US 2004/0070674 A1 Apr. 15, 2004

(51) Int. Cl.
*H04N 5/232* (2006.01)
*H04N 5/225* (2006.01)

(52) U.S. Cl. ............... 348/211.12; 348/207.11; 345/157; 345/179

(58) Field of Classification Search ............ 348/211.12
See application file for complete search history.

(56) References Cited

U.S. PATENT DOCUMENTS

| | | | | |
|---|---|---|---|---|
| 5,239,373 | A * | 8/1993 | Tang et al. | 348/14.01 |
| 5,940,049 | A * | 8/1999 | Hinman et al. | 353/20 |
| 6,597,410 | B1 * | 7/2003 | Doany et al. | 348/744 |
| 2002/0030637 | A1 * | 3/2002 | Mann | 345/8 |
| 2002/0180726 | A1 * | 12/2002 | Shi et al. | 345/418 |
| 2003/0098957 | A1 * | 5/2003 | Haldiman | 353/69 |
| 2007/0013716 | A1 * | 1/2007 | Kjeldsen et al. | 345/594 |

OTHER PUBLICATIONS

Yamazaki, K., et al., "GestureLaser and GestureLaser Car: Development of an Embodied Space to Support Remote Instruction," *Proc. ECSCW'99*, pp. 239-258, 1999; http://www.kuzuoka-lab.esys.tsukuba.ac.jp/~kuzuoka/publications/ecscw99/ecscw99.html.

Paulos, E., and Canny, J., "PRoP: Personal Roving Presence," *Proceedings of CHI*, ACM, 1998, pp. 296-303; http://www.prop.org/papers/chi98.pdf.

Azuma, R. T., "A Survey of Augmented Reality," *Computer Graphics (SIGGRAPH '95 Proceedings, Course Notes # 9: Developing Advanced Virtual Reality Applications)* (Aug. 1995), pp. 1-38; http://citeseer.nj.nec.com/azuma95survey.html.

Pangolin Systems, "Inside the Laser Projector," http://www.pangolin.com/resguide03.htm, 1999.

Tang, J., and Minneman, S., "VideoWhiteboard: Video Shadows to Support Remote Collaboration," Proceedings of CHI, ACM, 1991, pp. 315-322; http://www.1.ics.uci.edu/~jpd/NonTradU1/p315-tang.pdf.

Underkoffler, J., Ullmer, B. and Ishii, H., "Emancipated Pixels: Real-World Graphics in the Luminous Room," *Proc. SIGGRAPH '99, Special Interest Group on Computer Graphics*, 1999, http://tangible.media.mit.edu/papers/Luminous_Room_SG99/Luminous_Room_SG99.html.

(Continued)

*Primary Examiner*—Lin Ye
*Assistant Examiner*—Hung H. Lam
(74) *Attorney, Agent, or Firm*—Fliesler Meyer LLP

(57) ABSTRACT

A system, method and apparatus for remotely annotating an object. An embodiment of the present invention includes a video camera projector that captures video images of a local object and projects annotations made by a user at a remote location onto said local object.

24 Claims, 11 Drawing Sheets

OTHER PUBLICATIONS

Z. Zhang, "A Flexible New Technique For Camera Calibration," *IEEE Transactions on Pattern Analysis and Machine Intelligence*, 22(11):1330-1334, 2000; http://research.microsoft.com/~zhang/calib/.

Wolberg, G., "Digital Image Warping," *IEEE Computer Society Press*, ISBN: 0-8186-8944-7 (1990).

* cited by examiner

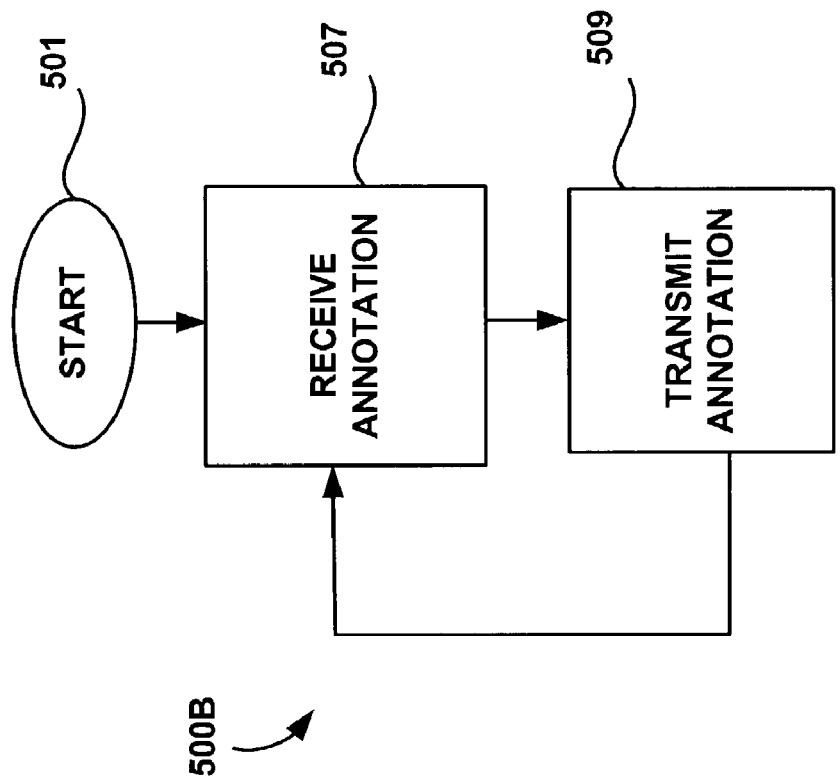
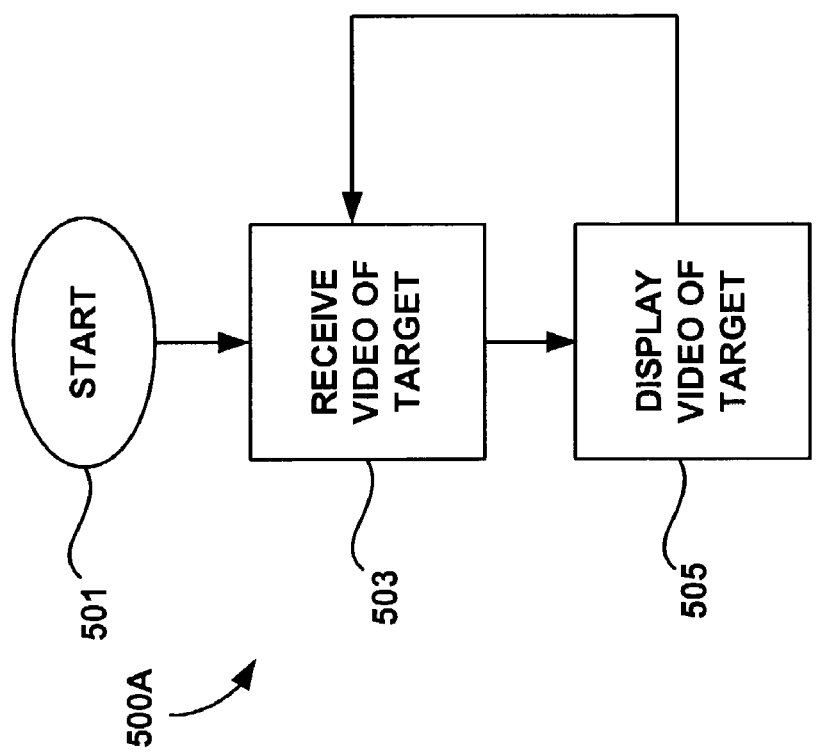

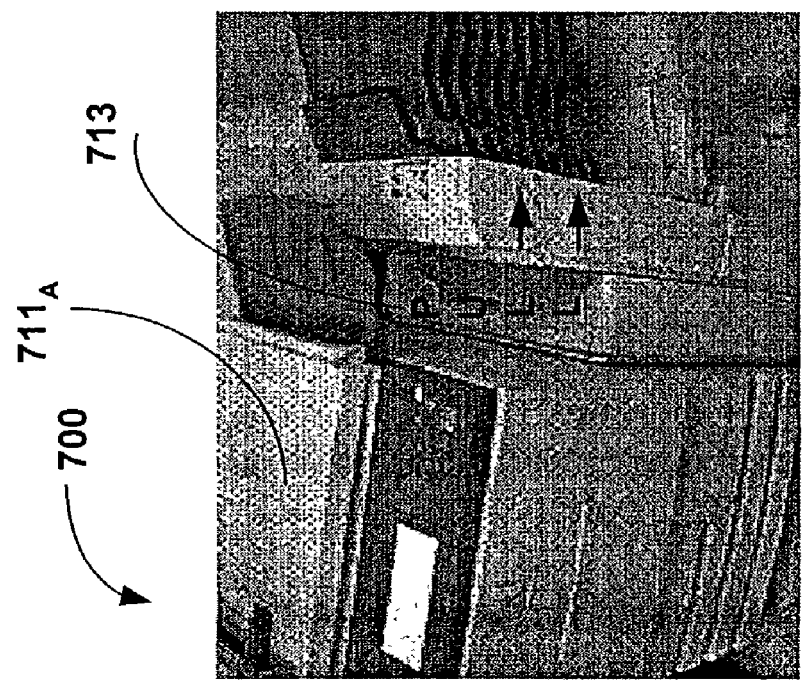
FIG. 7

METHOD, APPARATUS, AND SYSTEM FOR REMOTELY ANNOTATING A TARGET

FIELD OF THE INVENTION

The present invention is related to the field of remote annotation of objects (targets), and more particularly to the field of drawing and projecting annotations onto a target.

BACKGROUND AND SUMMARY

Currently there is a need for a method, apparatus, and system that provides the ability to view a target at a "local location" from a remote location and also provides the ability to "draw," from the remote location, annotations that are viewable at the local location. Local location, as referred to herein, is the location of a target.

According to an aspect of the invention, a method for annotating from a remote location a target positioned at a local location is provided. The method includes the steps of capturing video of the target at the local location with a video capture device, and projecting an annotation onto the target at the local location with a video projection device.

According to another aspect, a method for annotating from a remote location a target positioned at a local location that includes the steps of receiving at the remote location a video of the target, and displaying on a graphical user interface at the remote location the received video is provided. A user at the remote location may then "draw" (annotate) on the displayed video. The system obtains the annotation, and transmits from the remote location the annotation.

In still another aspect, the invention comprises an apparatus that includes a video capture device, a video projecting device and a transmission device. In an embodiment, the video capture device and the video projecting device are positioned substantially coaxial to one another.

BRIEF DESCRIPTION OF THE DRAWINGS

The invention will be described with respect to the particular embodiments thereof. Other objects, features, and advantages of the invention will become apparent with reference to the specification and drawings in which:

FIGS. 5A and 5B illustrate processes performed at a remote location for annotating an object located at a local location, according to an embodiment of the present invention;

DETAILED DESCRIPTION

Figure 1A:
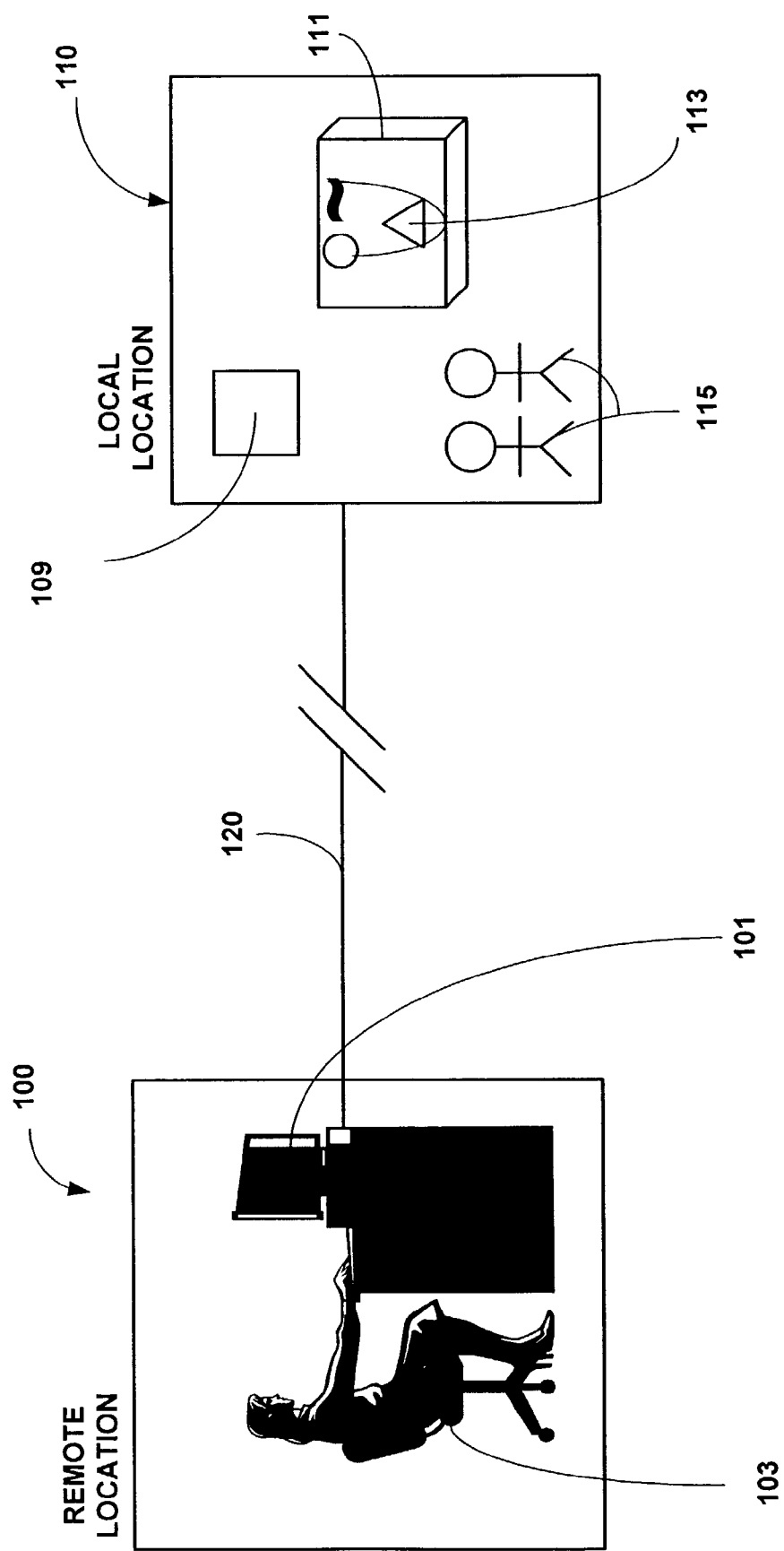
FIG. 1A is a simplified block diagram illustrating an embodiment of the present invention.

FIG. 1A is a simplified block diagram illustrating an embodiment of the present invention having a remote location 100 and a local location 110. Local location 110 includes a Video Camera/Projector System 109 ("C/P System") that may be used to receive annotations 113 from a remote location 100 and project those annotations 113 onto a target 111 that is viewable by one or more local users 115. A target as described herein maybe any physical object at local location 110. For example, target 111 may be a photocopier, marker board, wall, floor, oven, microwave, televison, person, etc.

C/P System 109 also captures video of target 111 and any annotations 113 that are projected onto target 111. C/P System 109 transmits the video to a remote location 100 through transmission channel 120. Transmission channel 120 may be any type of transmission channel. For example, transmission channel 120 may be the Internet, a Local Area Network ("LAN"), Wide Area Network ("WAN"), fiber optic network, radio-frequency ("RF"), point-to-point, dedicated or closed-circuit cable, etc. In an embodiment, the captured video is transmitted through transmission channel 120 as it is captured. In another embodiment, in addition to transmitting the captured video a recording of the video is also made.

Remote location 100 includes a computing system 101 that may be used by a remote user 103 to interface with the C/P System 109 through transmission channel 120. In an embodiment, remote user 103 can view the transmitted video of target 111 and any existing annotations 113. Additionally, remote user 103, using computing system 101 can "draw" additional annotations 113 on target 111 located at local location 110. Annotations drawn by remote user 103 are transmitted from the computing system 101 through transmission channel 120 and projected by C/P System 109 onto target 111.

In a simple case, a remote user 103 may control, from remote location 100, one or more spots of light (annotations) that are projected onto target 111, to direct attention or indicate a particular location on target 111 to a local user 115. For example, a white spot can be used to illuminate a particular area of target 111 for closer inspection. In an embodiment, remote user 103 may "draw" more complicated figures or text on target 111 using computing system 101. For example, text, web pages, images, or even video can be used as annotations 113 that are projected onto target 111.

Figure 1B:
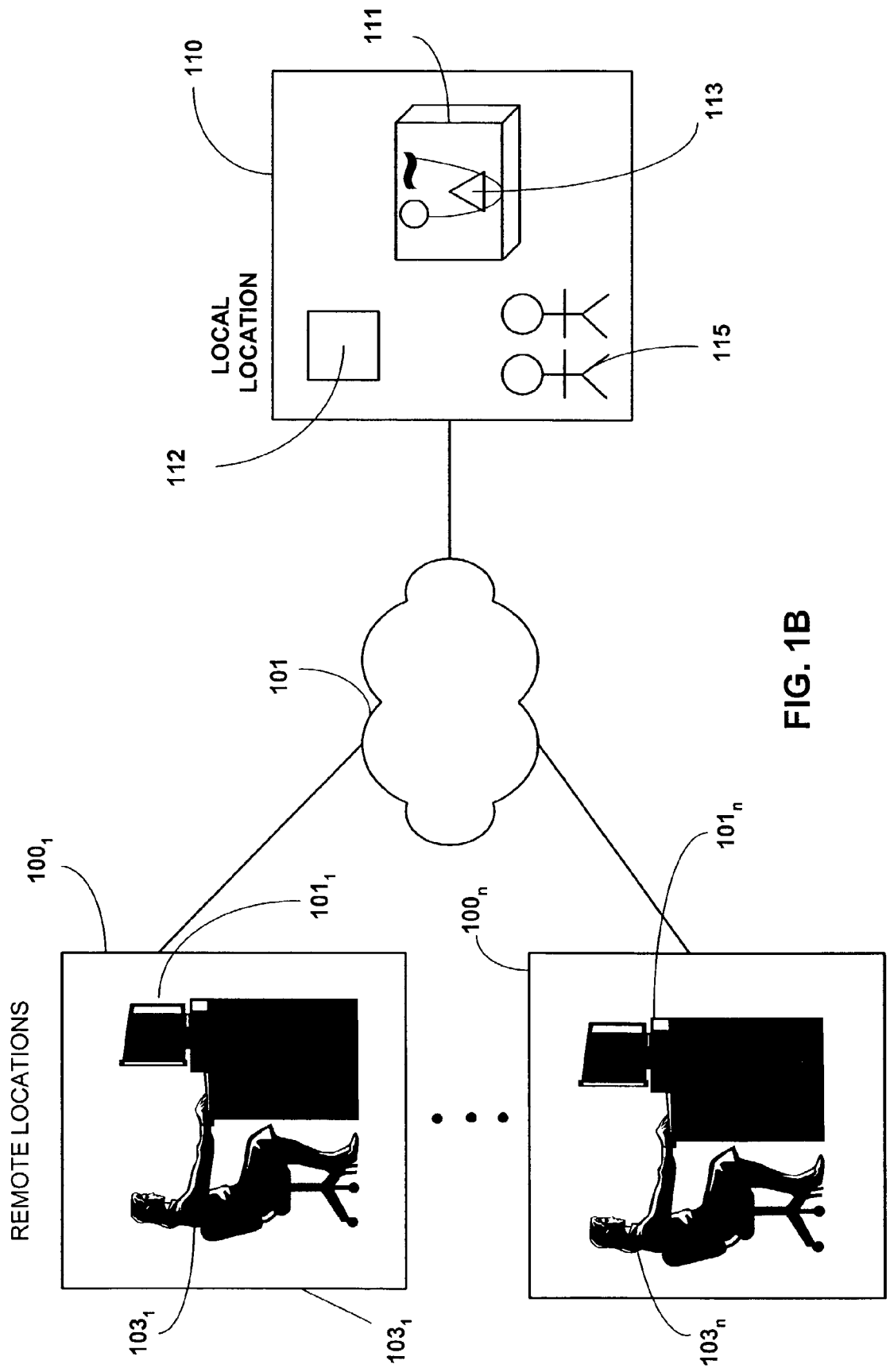
FIG. 1B is a simplified block diagram of an alternative embodiment of the present invention.

FIG. 1B is a simplified block diagram of an alternative embodiment of the present invention that includes multiple remote locations $100_1$ through $100_n$. Each remote location $100_1$-$100_n$ can view video of target 111 and any existing annotations 113. Additionally, each remote user $103_1$-$103_n$ can "draw" additional annotations, using a computing system $100_1$-$100_n$, that are projected onto target 111 at local location 110 via C/P System 112. In an embodiment, video of target 111 and annotations 113 are transmitted via transmission channel 101 to each remote location $100_1$-$100_n$. Transmission channel 101 may be, for example, the Internet, a LAN, WAN, RF, point-to-point, dedicated or closed-circuit cable, or any other type of transmission channel.

C/P System

Figure 2A:
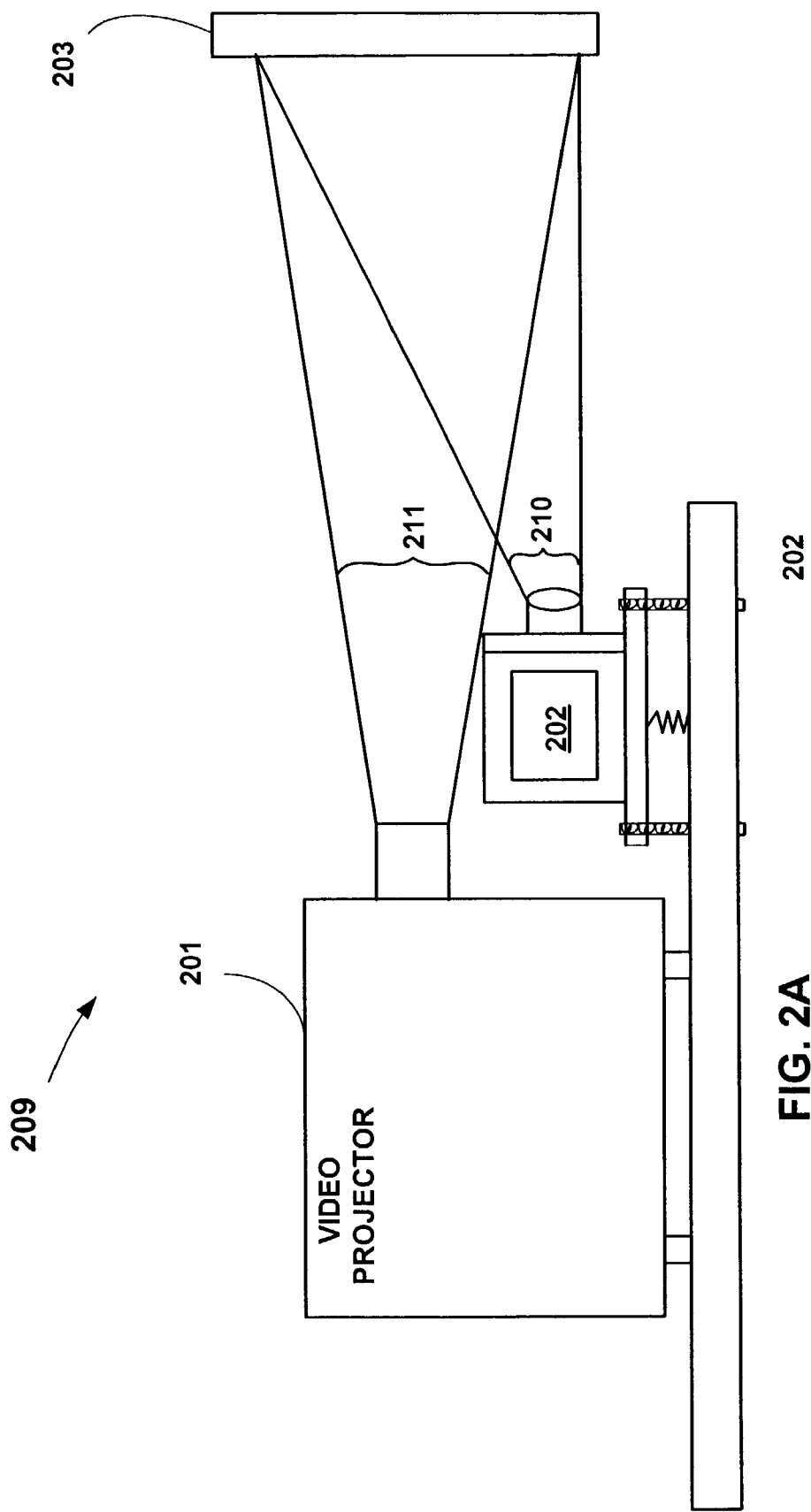
FIG. 2A illustrates a block diagram of Video Camera/Projector System, according to an embodiment of the present invention.

FIG. 2A illustrates a block diagram of C/P System 209, according to an embodiment of the present invention. It will be understood that C/P System 209 illustrated in FIG. 2A is similar to C/P System 109 described with respect to FIG. 1A.

Video projector 201 projects annotations received from a remote location onto target 203. In an embodiment, a Liquid Crystal Display ("LCD") video projector is used. Other embodiments may utilize different types of video projectors. For example, a Digital Light Processing ("DLP") video projector, or a monochrome or color projector using a servo-controlled scanning laser may also be used.

Video camera 202 captures video of target 203 and any annotations that are projected onto target 203. In an embodiment, an analog National Television Standards Committee ("NTSC") format video camera is used. Other embodiments may incorporate other types of video cameras. For example, an analog Phase Alternate Line ("PAL") format video camera, digital video camera, or a digital still camera in any format may be used. In an embodiment using a still camera, images maybe transmitted at a reduced rate, such as one image per second.

By positioning video camera 202 and video projector 201 close to coaxial, both the video camera's 202 and video projector's 201 fields of view 210 and 211 will be substantially similar. Aligning the fields of view 210, 211 results in projected annotations appearing reasonably similar to the remote user's intent. In an embodiment, a separate transmission channel is also utilized for voice communication between a local user and remote user.

Figure 2B:
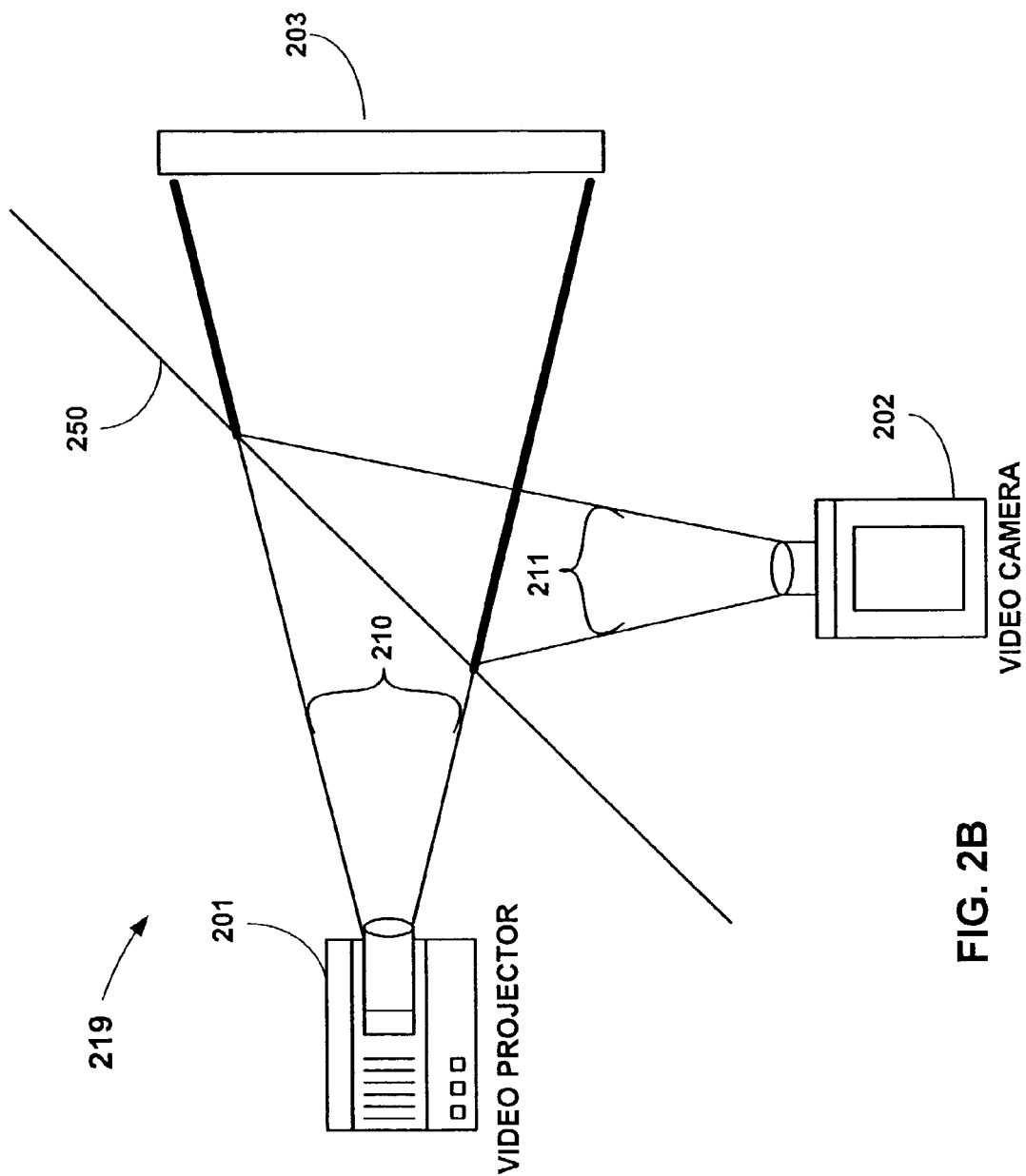
FIG. 2B illustrates an alternative Video Camera/Projector System, according to an embodiment of the present invention.

FIG. 2B illustrates another C/P System 219, according to an alternative embodiment of the present invention. C/P System 219 includes video projector 201 arranged perpendicular to video camera 202 and a partially-transmissive mirror 250 positioned in the field of view of both video projector 201 and video camera 202. Mirror 250 allows the field of view 210 of video projector 201 to remain unaltered but redirects the field of view 211 of video camera 202 by approximately 90° to coincide with the field of view 210 of video projector 201. In an alternative embodiment, mirror 250 produces the opposite result (i.e., field of view 211 of video camera 202 remains unaltered and field of view 210 of video projector 201 is redirected by approximately 90°). In still another embodiment, an arrangement of two prisms is used to redirect the fields of view so they both view the same target 203.

In addition to aligning the fields of view 210, 211 as described above, to ensure that annotations made by a remote user are projected at the appropriate position on a target at a local location, adjustments to the projection and/or camera view may be performed. In an embodiment, this may be accomplished by warping the projected annotations and/or the video captured by camera 202 to compensate for optical distortion in projector 201 and/or camera 202. In an embodiment, affine transformations are utilized to scale, rotate, and shift the projected image and recorded image so that they coincide. Other distortion correction techniques, such as those described in G. Wolberg, "Digital Image Warping," IEEE Computer Society Press, ISBN: 0-8186-8944-7 (1990), may also be used.

Additionally, lens distortion of the camera or the projector can also be corrected. For example, radial distortion from a wide-angle lens, can be corrected with an inverse radial transform, both on the projector 201 output (so a projected annotation of a line will result in a straight line and not a curve) and/or the video camera 202 (so that a captured annotation of a line will result in a straight line when displayed at a remote location). This may be accomplished using a variety of techniques. For example, radial transformation as described in *A Flexible New Technique For Recorder Calibration,* by Z. Zhang may be utilized. Other calibrations or corrections to closer approximate a recording (or projection) system may also be used.

Figure 2C:
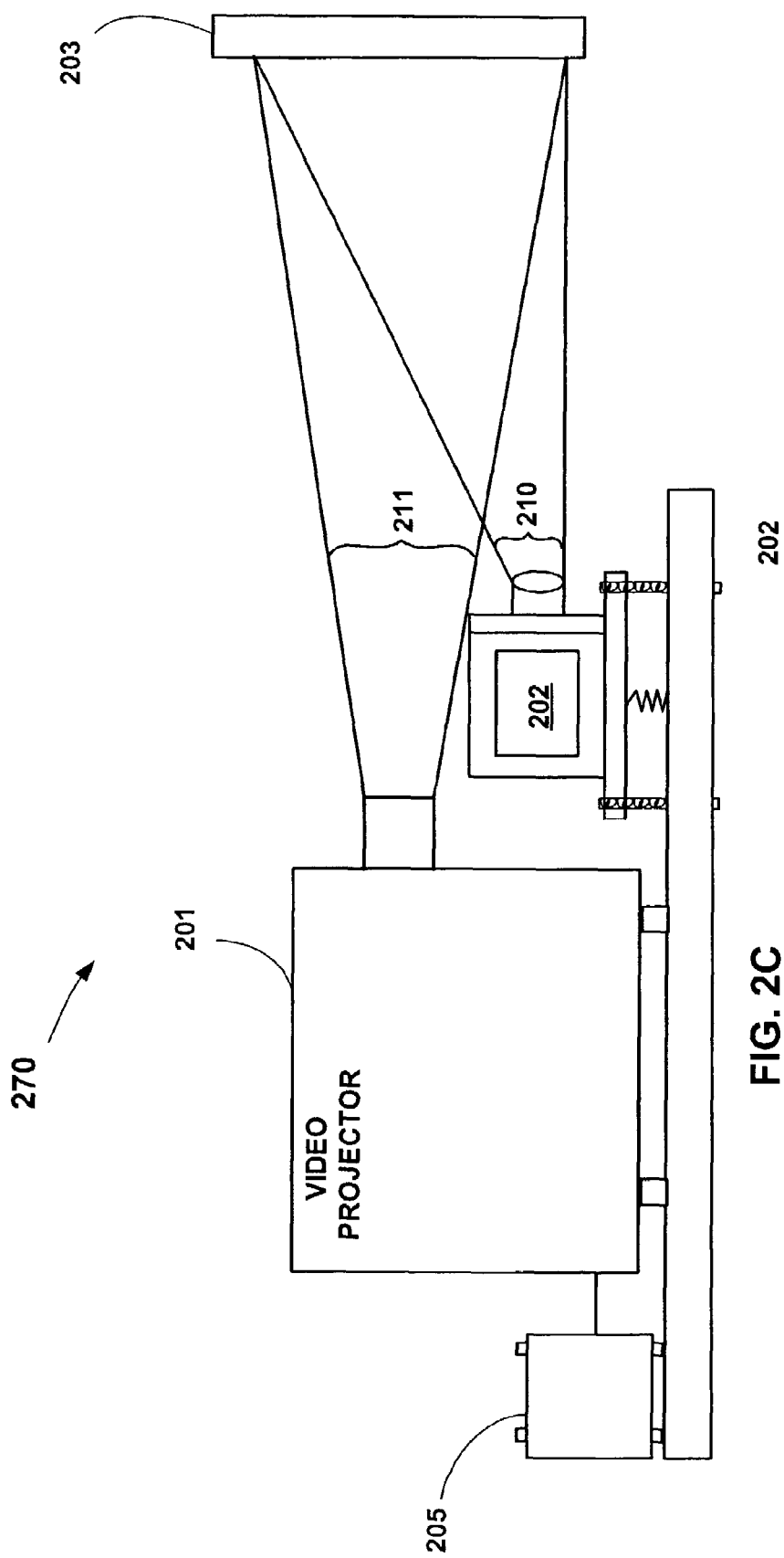
FIG. 2C illustrates another embodiment of a Video Camera/Projector System.

FIG. 2C illustrates yet another C/P System 270 according to an embodiment of the present invention. It will be understood that C/P System 270 illustrated in FIG. 2C is similar to C/P System 112 illustrated in FIG. 1B and similar to C/P System 209 illustrated in FIG. 2A. C/P System 270 includes the additional component of video mixer 205 which is used to combine annotations received from multiple remote locations. For example, referring to FIG. 1B, annotations may be received from remote locations $100_1$-$100_n$ which are combined/mixed using mixer 205 and projected through video projector 201 onto target 203.

Figure 2D:
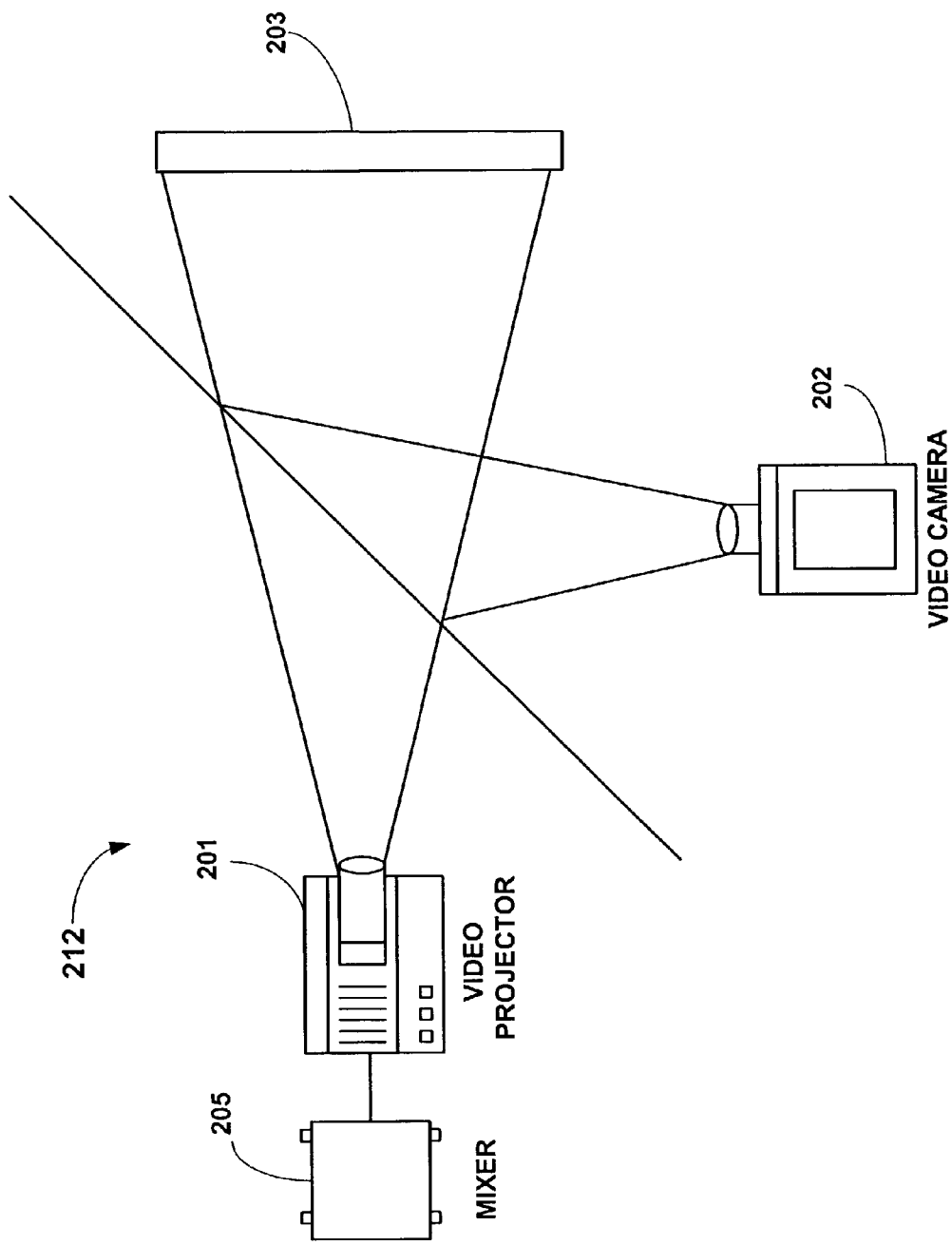
FIG. 2D illustrates still another embodiment of a Video Camera/Projector System.

FIG. 2D illustrates an alternative C/P System 212, according to an embodiment of the present invention. It will be understood that C/P System 212 illustrated in FIG. 2D is similar to C/P System 112 illustrated in FIG. 1B and is similar to C/P System 219 illustrated in FIG. 2B. C/P System 212 contains the additional component of a video mixer 205 which is used to combine annotations received from multiple remote locations. For example, referring to FIG. 1B, annotations may be received from remote locations $100_1$-$100_n$ which are combined/mixed using mixer 205 and projected through video projector 201 onto target 203.

Graphical User Interface

Figure 3:
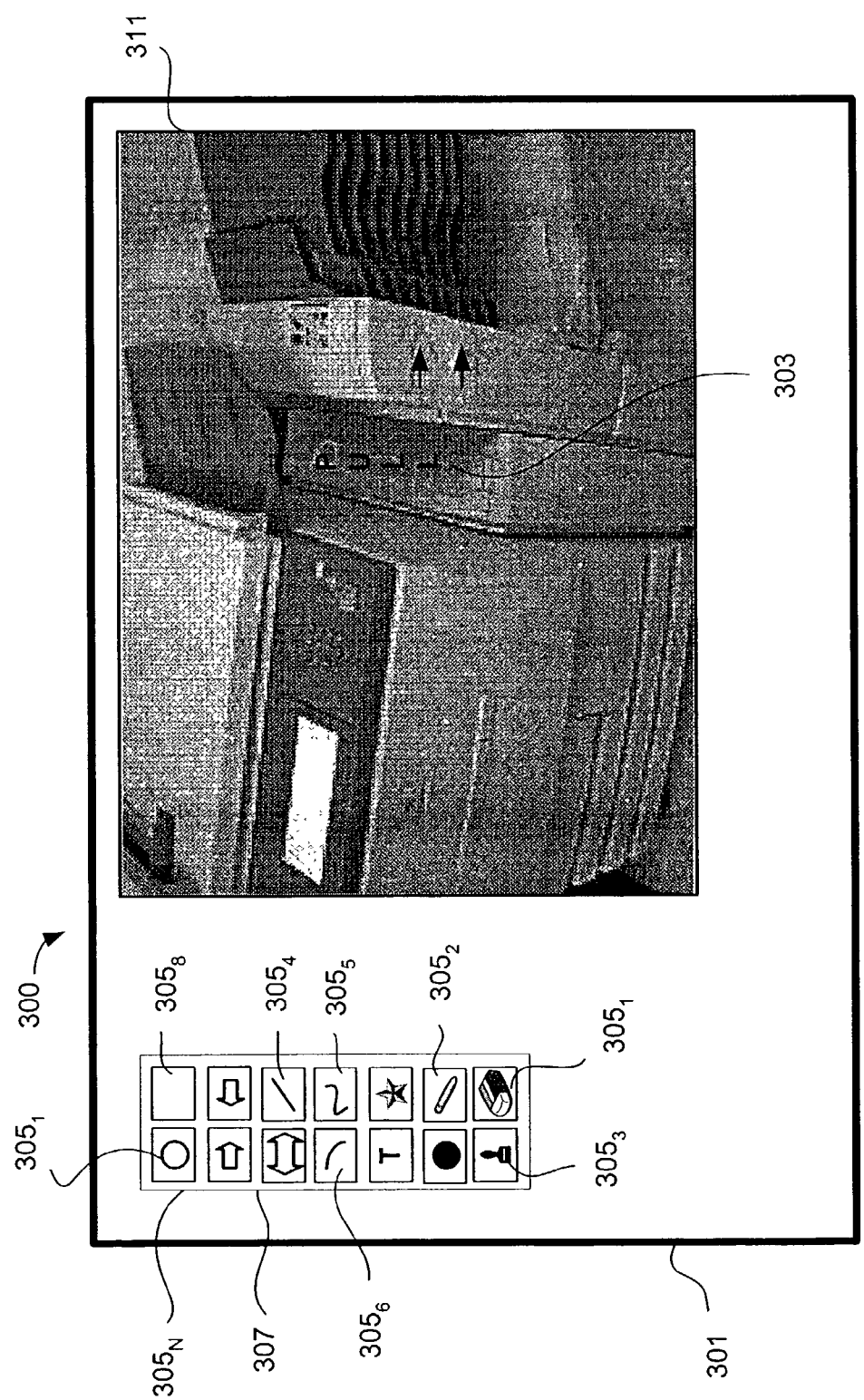
FIG. 3 illustrates a block diagram of a remote location with a graphical user interface, according to an embodiment of the present invention.

FIG. 3 illustrates a block diagram of a remote location 300 with graphical user interface ("GUI") 301, according to an embodiment of the present invention. GUI 301 displays video 311 of a target that is received from a C/P System at a local location. A user at remote location 300 can "draw" annotations 303 onto video 311 using a pen-based or other interface. Additionally, a user can input text onto video 311 using a keyboard that is in communication with GUI 300.

GUI 301 allows a remote user to select interaction modes $305_N$, for example spots of colored light $305_1$ or pen-like interaction $305_2$, so that a pointer moved across video 311 leaves an appropriate annotation. In an embodiment, GUI 301 provides the ability to use all types of images and text as annotations. Additionally, a "toolbox" 307 displaying different interaction modes $305_N$ may also be included. For example, a user is able to select different colors $305_3$, input modes, size of annotations, line width $305_4$, line type $305_4$, $305_5$, $305_6$, eraser $305_7$, clear annotations $305_8$, etc.

In an embodiment, annotations 303 are implemented as an "overlay" over video 311 and the x-y coordinates of a pointer are used to render an "overlay" annotation onto a background that does not project light, such as a black background. That overlay annotation is transmitted to C/P System and projected onto a target. The projected annotations are captured by C/P System as they are projected onto a target and that captured video is transmitted and displayed on GUI 301. Displaying video of the annotation projected onto a target allows a remote user to see the annotations the same as a local user. Thus, if the annotation does not project well onto a target (e.g. it cannot be seen or is unclear), a remote user can alter the annotation.

System Operation

Figure 4B:
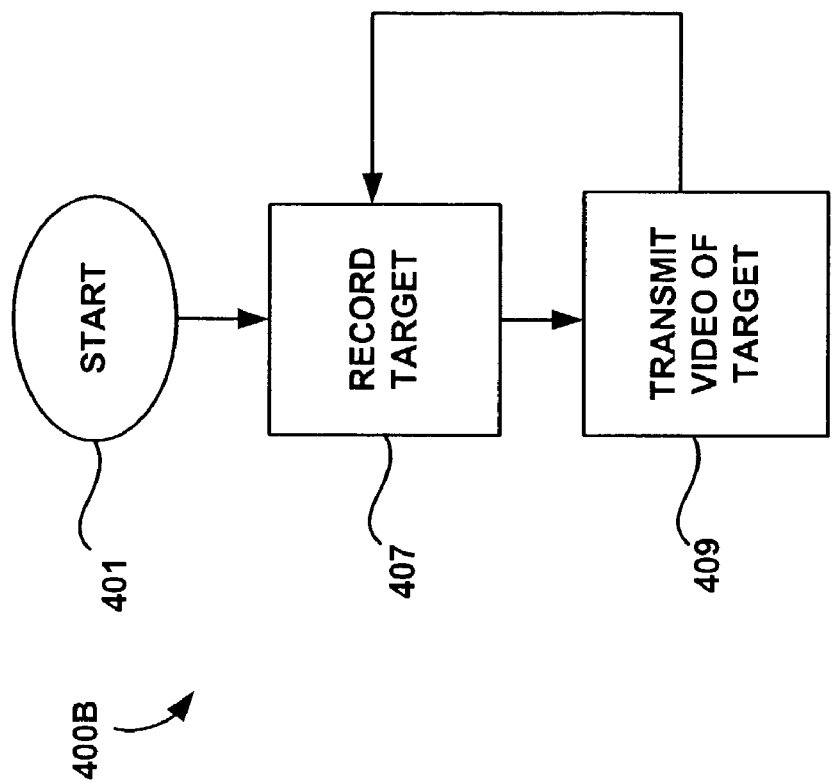
FIGS. 4A and 4B illustrate processes performed by Video Camera/Projector System, according to an embodiment of the present invention.
Figure 4A:
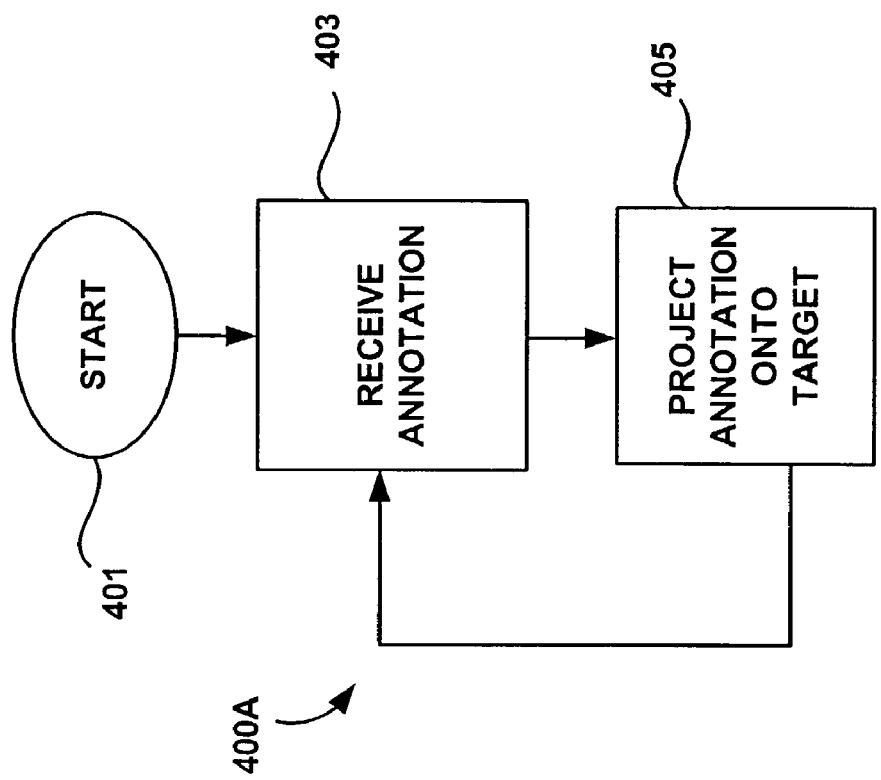

FIGS. 4A and 4B illustrate processes 400a and 400b performed by C/P System for projecting annotations onto a target (400a) and capturing/transmitting video of a target and any annotations, according to an embodiment of the present invention. Processes 400a and 400b are performed by C/P System at the same time and asynchronously. As one who is skilled in the art would appreciate, FIGS. 4A, 4B, 5A, 5B, and 6 illustrate logic boxes for performing specific functions. In alternative embodiments, more or fewer logic boxes may be used. In an embodiment of the present invention, a logic box may represent a software program, a software object, a software function, a software subroutine, a software method, a software instance, a code fragment, a hardware operation or user operation, singly or in combination.

Process 400a begins in logic box 401 and control is passed to logic box 403. In logic box 403 the C/P System receives an annotation from a remote location and in logic box 405 C/P System projects the annotation onto a target at the local location. After projection of the annotation onto a target, control is returned to logic box 403 and the process repeated.

Process 400b starts at logic box 401 and control is passed to logic box 407 where a video camera from the C/P System captures video of a target and any projected annotations. In logic box 409 the video of the target captured in logic box 405 is transmitted from a local location to a remote location. Video may be transmitted as it is captured (streaming) or at predetermined intervals. Additionally, transmission may use any protocol, such as NTSC, PAL, or any digital format (e.g. MPEG, JPEG, etc.). Control is then returned to logic box 407 and the process repeated.

FIGS. 5A and 5B illustrate processes 500a and 500b performed by a computing system at a remote location for annotating, from the remote location, a target located at a local location, according to an embodiment of the present invention. Processes 500a and 500b are performed at the same time and asynchronously. Process 500a begins at logic box 501 and control is passed to logic box 503 whereupon video of the target to be annotated is received. In logic box 505 the received video is displayed on a graphical user interface to a user at the remote location. Control is returned to logic box 503 and the process repeated.

Process 500b begins in logic box 501 and control is passed to logic box 507 where the method awaits input of an annotation from the remote user at the remote location. Upon receipt of an annotation in logic box 507, control is passed to logic box 509 and the received annotation is transmitted to a local location. The C/P System at the local location projects the annotation onto the target.

Output Selection

In some embodiments, the local user may see a distorted version of the projected annotations, particularly if a target is a non-planar. For simple gesture based annotations (such as those shown in FIGS. 3 and 7) this will not be a large problem. However, problems may arise with specular (mirror-like) or dark absorbing objects. If an annotation is not visible because of absorption, reflection, or shadow, this would be apparent to the remote user who could then modify the annotations so they are more visible. In many cases, it may be possible to arrange scenes so there is a significant flat surface upon which the remote user can project complicated annotations.

However, in situations where the target is not conducive to displaying annotations directly on a target, in an embodiment, a user has the option of alternatively displaying video of the target and annotations onto a monitor located at the local location and/or displaying the annotations directly onto the target.

Figure 6:
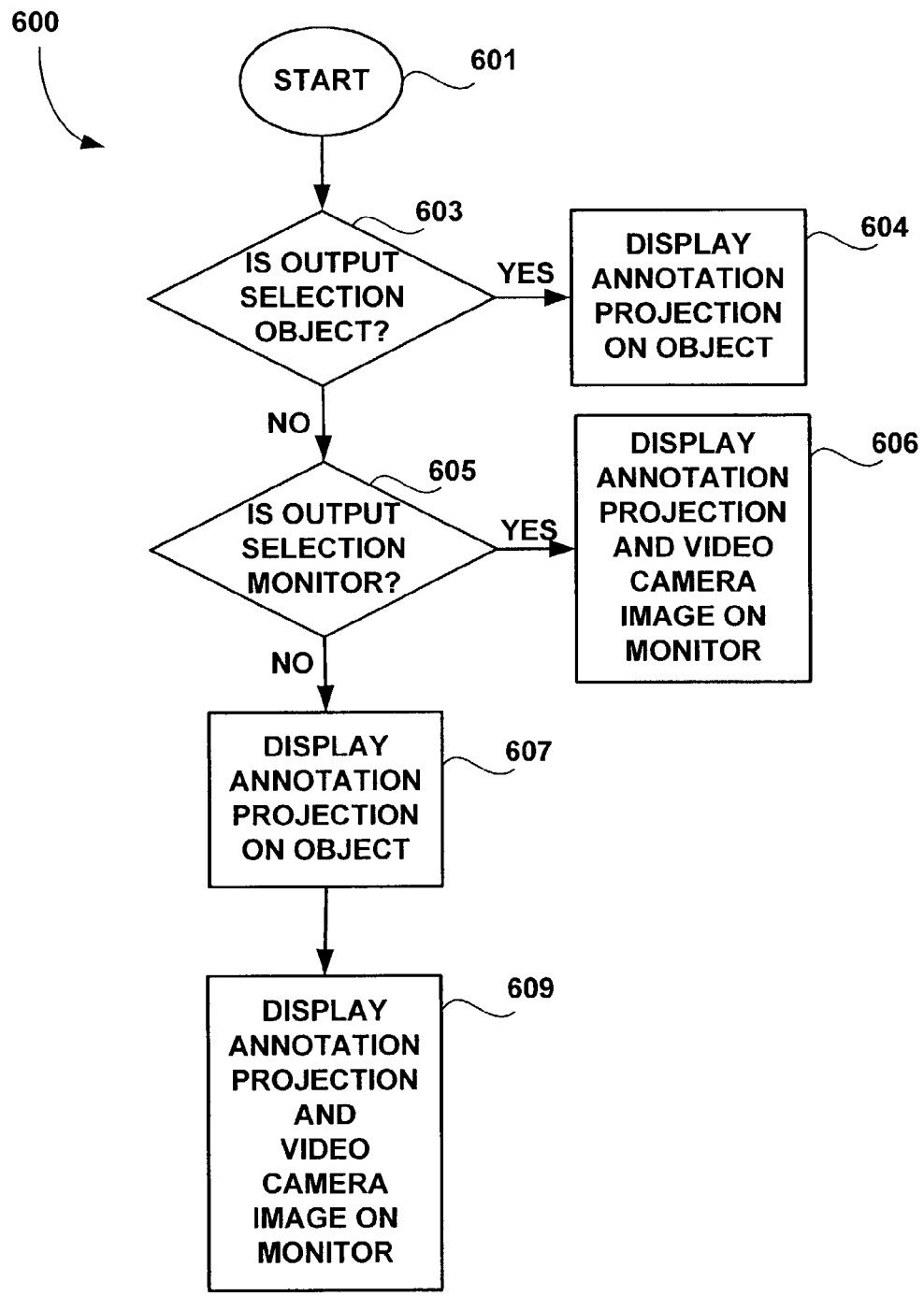
FIG. 6 illustrates a process for displaying annotations on an object at a local location to different displays, according to an embodiment of the present invention; and, FIG. 7 illustrates a target at a local location including annotations displayed using an embodiment of the present invention.

FIG. 6 illustrates a process for displaying annotations on an object at a local location to different display devices, according to an embodiment of the present invention. Method 600 begins at logic box 601 and control is passed to logic box 603 where the C/P System determines if the output selection is "OBJECT." If the output selection is OBJECT, control is passed to logic box 604 and annotations are projected directly onto the object as described above. If, however, it is determined in logic box 603 that the output selection is not OBJECT, control is passed to logic box 605.

In logic box 605 it is determined whether the output selection is "MONITOR." If the output selection is MONITOR, control is passed to logic box 606 where the system displays on a monitor, at the local location, the video recorded by the video camera and the annotations made by the remote user.

If, however, it is determined in logic box 605 that the output selection is not MONITOR, control is passed to logic box 607. In such a situation the remaining output selection is "BOTH" and in logic box 607, as described above, the annotations are projected directly onto the object and in logic box 609 the annotation to be projected and the recorded video of the target are also displayed on a monitor.

EXAMPLES

FIG. 7 illustrates target $711_A$ at local location 700 containing annotations 713 displayed using an embodiment of the present invention. In an embodiment, target $711_A$ is recorded and transmitted to a remote location and a user in a remote location can simultaneously "draw" annotations 713 that are projected onto target $711_A$.

FIG. 7 illustrates a photocopier as target $711_A$ which is in need of maintenance. Instead of requiring repair personnel to physically appear at local location 700 where target $711_A$ is located, using an embodiment of the present invention, repair personnel located at a remote location can view a video recording of target $711_A$ and "draw" annotations that are projected onto target $711_A$. As a result, repair personnel at a remote location can provide visual instructions directly on target $711_A$ that will assist an individual at local location 700 in performing the necessary maintenance on target $711_A$. For example, repair personnel at a remote location has "drawn" annotations 713 (which are projected onto target $711_A$) informing a user at local location 700 to "PULL" at a specific point on the photocopier. By following these simple annotations, a user at local location 700 can perform the necessary maintenance on target $711_A$. Target $711_B$ illustrates the photocopier after a user at local location 700 has performed the instructed maintenance.

Another example is use of an embodiment of the present invention to project annotations onto a whiteboard. In this example, users at the local location and the remote location would effectively be able to both draw on the same whiteboard. Marks physically made on the whiteboard by a user at a local location would be recorded, transmitted and displayed to a user at a remote location while marks/annotations made by a remote user would be transmitted and projected onto the whiteboard at the local location.

In another example, an embodiment of the present invention could be used by a doctor at a remote location to assist in a surgery at a local location. Positioning the R/C System to record/project at the point of surgery, the doctor at a remote location could identify where to perform necessary procedures, such as incision or cauterization.

Another example is use of the C/P System in entertainment, sports, or military applications. In a performing arts scenario a play director could use an embodiment of the invention to indicate actor movements ("blocking") via an overhead C/P System. Given a wireless pen tablet (remote computing system), the director could sit in the audience seating (remote location) and indicate precise directions to a particular actor by projecting annotations onto the stage floor (local location). Given the availability of high-luminosity laser projectors, such a scenario could be extended to a sports field or even a nighttime battlefield, using an infrared laser and IR-sensitive goggles for troops.

It should be understood that the particular embodiments described above are only illustrative of the principles of the present invention, and various modifications could be made by those skilled in the art without departing from the scope and spirit of the invention. Thus, the scope of the present invention is limited only by the claims that follow.

What is claimed is:

1. A method for annotating from a first remote location a target positioned at a second local location comprising the steps of:
    capturing a video of the target at the second local location with a video camera/projector device;
    transmitting said video of the target to a computing system at the first remote location;
    displaying the video on a graphical user interface (GUI) of the computing system;
    receiving input of text and images onto the video via the GUI of the computing system;
    transmitting the inputted annotations to the second local location;
    projecting the inputted annotations onto the target at the second local location with the video camera/projector device; and
    controlling the projected annotation to be projected at an appropriate position on the target by warping the projected annotations, in order to compensate for optical distortion, the appropriate position being based on image displayed on the GUI of the computing system.

2. The method of claim 1, wherein said projected annotation is text.

3. The annotation of claim 2, wherein said text is handwritten text.

4. The method of claim 1 wherein said video camera/projector device includes a video camera having a first field of view and a video projector having a second field of view.

5. The method of claim 4, wherein said first field of view and said second field of view are both arranged to view said target.

6. The method of claim 4, wherein said video camera/projector device includes a partially transmissive mirror positioned in said first field of view and said second field of view.

7. The method of claim 4 wherein said video camera is positioned relatively coaxial to said video projector.

8. The method of claim 1 further including:
    capturing with the video camera/projector device, subsequent to the step of projecting, a second video of the target and the projected annotation; and,
    transmitting from the second location the captured video.

9. The method of claim 1 wherein the graphical user interface includes a display window displaying the received video of the target.

10. The method of claim 1 wherein the graphical user interface includes an input selection allowing selection of different annotations.

11. The method of claim 1 wherein, in situations where the target is not conducive to displaying annotations directly on the target, projecting further includes providing an option of at least one of:
    displaying the video of said target and said annotations onto a monitor located at the second local location; and
    displaying the annotations directly onto said target.

12. The method of claim 1 wherein annotating the video of said target further includes:
    providing, at said first remote location, a graphical user interface (GUI) for selecting between a plurality of different interaction modes to annotate the video of said target.

13. The method of claim 1 wherein said graphical user interface displays a plurality of different interaction modes selectable by a user in making an annotation.

14. An apparatus comprising:
    a video capture device having a first field of view;
    a video projecting device having a second field of view, wherein said video capture device and said video projecting device are positioned so the first field of view and the second field of view are similar and wherein a set of annotations projected by said video projecting device are warped to compensate for optical distortion in order to ensure that annotations are projected at an appropriate position on a target;
    a transmission device; and
    a computing device adapted to interface with the video capture device and with the video projecting device from a remote location through the transmission device, wherein said interface further comprises a means for receiving video from the video capture device and a means for sending the annotations to the video projecting device for projecting onto the target.

15. The apparatus of claim 14, wherein said transmission device transmits a first image obtained from said video capture device, and wherein said transmission device receives a second image for projecting through said video projection device.

16. The apparatus of claim 15, wherein said video projecting device is positioned to project said second image onto a target; and,
    wherein said video capture device is positioned to capture an image of said target and said projected second image.

17. The apparatus of claim 14 further comprising:
    a partially transmissive mirror positioned in said first field of view and in said second field of view.

18. The apparatus of claim 17 wherein said partially transmissive mirror is positioned to adjust the first field of view to coincide with the second field of view.

19. The apparatus of claim 14 wherein projecting the video onto the target includes receiving a selection of at least one of: displaying the video and said annotations onto a monitor; and displaying the annotations directly onto said target.

20. The apparatus of claim 14 wherein said computing device further includes:
    a graphical user interface for selecting between a plurality of different interaction modes to annotate the video of said target.

21. A system for annotating from a first remote location a target positioned at a second local location, the system comprising:
- a video camera/projector device at the second local location, the video camera/projector device configured to capture video of the target at the second local location; and,
- a computing system at the first remote location in communication with the video camera/projector device at the second local location, the computing system configured to receive the video from the video camera/projector device, display the received video on a graphical user interface (GUI), and make annotations to the video by receiving input of at least one of text and images onto the video via the GUI;
- wherein the video camera/projector device is configured to project the annotations at the second local location and control the annotations to be projected at the appropriate position on the target by warping the projected annotations in order to compensate for optical distortion, the appropriate position being based on image displayed on the GUI of the computing system.

22. The system of claim 21 wherein said video camera/projector device includes:
- a video camera having a first field of view;
- a video projector having a second field of view; and
- wherein said first field of view and said second field of view are similar.

23. The system of claim 21 wherein projecting the video at the second local location further includes receiving a selection of at least one of: displaying the video and said annotations onto a monitor; and displaying the annotations directly onto said target.

24. The system of claim 21 wherein the computing system at said first remote location further includes:
- a graphical user interface for selecting between a plurality of different interaction modes to annotate the video of said target.

* * * * *